United States Patent
A V et al.

(10) Patent No.: US 10,762,437 B2
(45) Date of Patent: Sep. 1, 2020

(54) SELF-LEARNING BASED CRAWLING AND RULE-BASED DATA MINING FOR AUTOMATIC INFORMATION EXTRACTION

(71) Applicant: Tata Consultancy Services Limited, Mumbai (IN)

(72) Inventors: Arun Kumar A V, Bangalore (IN); Hemant Kumar Rath, Bangalore (IN); Shameemraj M Nadaf, Bangalore (IN); Anantha Simha, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1162 days.

(21) Appl. No.: 15/077,563

(22) Filed: Mar. 22, 2016

(65) Prior Publication Data
US 2016/0371603 A1     Dec. 22, 2016

(30) Foreign Application Priority Data
Jun. 19, 2015   (IN) .......................... 2345/MUM/2015

(51) Int. Cl.
*G06N 20/00*     (2019.01)
*G06F 16/951*     (2019.01)
*G06F 16/95*     (2019.01)
*G06N 5/04*     (2006.01)

(52) U.S. Cl.
CPC .............. *G06N 20/00* (2019.01); *G06F 16/95* (2019.01); *G06F 16/951* (2019.01); *G06N 5/045* (2013.01)

(58) Field of Classification Search
CPC ........ G06N 20/00; G06N 5/045; G06F 16/95; G06F 16/951
See application file for complete search history.

(56) References Cited

U.S. PATENT DOCUMENTS

| | | |
|---|---|---|
| 6,631,369 B1 | 10/2003 | Meyerzon et al. |
| 6,638,314 B1 | 10/2003 | Meyerzon et al. |
| 7,424,484 B2 | 9/2008 | Ma et al. |
| 8,249,885 B2 | 8/2012 | Berkowitz et al. |

(Continued)

FOREIGN PATENT DOCUMENTS

| | | |
|---|---|---|
| CN | 1437140 A | 8/2003 |
| CN | 103186676 A | 7/2013 |

OTHER PUBLICATIONS

Danziger, P. "Big o notation." Apr. 2010. (Year: 2010).*

(Continued)

*Primary Examiner* — Alexey Shmatov
*Assistant Examiner* — Robert Bejcek, II
(74) *Attorney, Agent, or Firm* — Finnegan, Henderson, Farabow, Garrett & Dunner LLP (57) ABSTRACT

Methods and Systems for automatic information extraction by performing self-learning crawling and rule-based data mining is provided. The method determines existence of crawl policy within input information and performs at least one of front-end crawling, assisted crawling and recursive crawling. Downloaded data set is pre-processed to remove noisy data and subjected to classification rules and decision tree based data mining to extract meaningful information. Performing crawling techniques leads to smaller relevant datasets pertaining to a specific domain from multi-dimensional datasets available in online and offline sources.

22 Claims, 6 Drawing Sheets

(56) References Cited

U.S. PATENT DOCUMENTS

| | | | |
|---|---|---|---|
| 2007/0033188 A1* | 2/2007 | Levy | G06Q 99/00 |
| 2009/0177603 A1* | 7/2009 | Honisch | G01S 19/48 |
| | | | 706/45 |
| 2012/0254333 A1* | 10/2012 | Chandramouli | G06F 17/27 |
| | | | 709/206 |

OTHER PUBLICATIONS

Aggarwal, C. et al., "Intelligent Crawling on the World Wide Web with Arbitrary Predicates", Proceedings of the 10$^{th}$ international conference on World Wide Web, ACM, pp. 96-105, (2001).

Varlamis, I. et al., "An Automatic Wrapper Generation Process for Large Scale Crawling of News Websites", Proceedings of the 18$^{th}$ Panhellenic Conference on Informatics, ACM, pp. 1-6, (2014).

Hofmann, K. et al. "Reusing Historical Interaction Data for Faster Online Learning to Rank for IR", Proceedings of the sixth ACM international conference on Web search and data mining, ACM, pp. 182-192, (2013).

Esser, D. et al., "Few-Exemplar Information Extraction for Business Documents", Proceedings of the 16$^{th}$ International Conference on Enterprise Information Systems, http://www.icels.org, (2014).

Olston, C. et al., "Recrawl Scheduling Based on Information Longevity", Proceedings of the 17$^{th}$ international conference on World Wide Web, ACM, pp. 437-446, (2008).

Avraarn, I. et al., A Comparison over Focused Web Crawling Strategies, Informatics (PCI), 2011 15$^{th}$ Panhellenic Conference, IEEE, pp. 245-249, (2011).

Micarelli, A. et al., "Adaptive Focused Crawling", The Adaptive Web, LNCS 4321, Springer-Verlag Berlin Heidelberg, pp. 231-262, (2007).

Chakrabarti, S. et al., "Accelerated Focused Crawling through Online Relevance Feedback", Proceedings of the 11$^{th}$ international conference on World Wide Web, ACM, pp. 148-159, (2002).

\* cited by examiner

| Product $_1$ | Vendor $_1$ |
|---|---|
| Product $_2$ | Vendor $_2$ |
| Product $_n$ | Vendor $_n$ |

FIG. 3(a)

| Login | login, Sign in,... |
|---|---|
| UserName | userid, name, id,... |
| Password | password, pwd,... |

FIG. 3(b)

| Product₁ | Vendor₁ |
|----------|---------|
| Product₂ | Vendor₂ |
| Productₙ | Vendorₙ |

FIG. 4(a)

| Product Name | Pattern 1 | Pattern 2 | Pattern 3 | ..... | Pattern n |
|--------------|-----------|-----------|-----------|-------|-----------|

FIG. 4(b)

| Module Platform | Module Number | No of 10/100/ 1G ports | No of GE ports | No of 1/10 GE ports | No of 10GE ports | No of 40GE |
|---|---|---|---|---|---|---|
| name of the product | part number | | | | | |
| Cisco Nexus 2000 Series | N2K-C2224TP&&N2K-C2224TP-1GE | 24-DP | 0 | 0 | 2-UP | 0 |
| Cisco Nexus 2000 Series | N2K-C2224TF&&N2K-C2224TF-1GE | 24-DP | 0 | 0 | 2-UP | 0 |
| Cisco Nexus 2000 Series | N2K-C2232TM&&N2K-C2232TM-10GE | 0 | 0 | 32-DP | 8-UP | 0 |
| Cisco Nexus 2000 Series | N2K-C2232TM-E | 0 | 0 | 32-DP | 8-UP | 0 |
| Cisco Nexus 2000 Series | N2K-C2232PP&&N2K-C2232PP-10GE | 0 | 0 | 32-DP | 8-UP | 0 |
| Cisco Nexus 2000 Series | N2K-C2232PF&&N2K-C2232PF-10GE | 0 | 0 | 32-DP | 8-UP | 0 |
| Cisco Nexus 2000 Series | N2K-C2232TF&&N2K-C2232TF-10GE | 0 | 0 | 32-DP | 8-UP | 0 |
| Cisco Nexus 2000 Series | N2K-C2232TF-E | 0 | 0 | 32-DP | 8-UP | 0 |
| Cisco Nexus 2000 Series | N2K-C2148T-1GE | 0 | 48-DP | 0 | 4-UP | 0 |
| Cisco Nexus 2000 Series | N2K-C2248TP&&N2K-C2248TP-1GE | 48-DP | 0 | 0 | 4-UP | 0 |
| Cisco Nexus 2000 Series | N2K-C2248TP-E&&N2K-C2248TP-E-1GE | 48-DP | 0 | 0 | 4-UP | 0 |

FIG. 5

| Module Platform | Module Number | No of 10/100/1G ports | No of GE ports | No of 1/10 GE ports | No of 10GE ports | No of 40GE ports |
|---|---|---|---|---|---|---|
| name of the product | part number | | | | | |
| nexus 2000 series | n2k-c2348upq | 0 | 0 | 48-DP | 0 | 6-UP |
| nexus 2000 series | c2348upq8f&&n2k-c2348upq12f | 0 | 0 | 48-DP | 0 | 6-UP |
| nexus 2000 series | n2k-c2224tp | 24-DP | 0 | 0 | 2-UP | 0 |
| nexus 2000 series | n2k-c2228tp | 48-DP | 0 | 0 | 4-UP | 0 |
| nexus 2000 series | n2k-c2228tp-e | 48-DP | 0 | 0 | 4-UP | 0 |
| nexus 2000 series | n2k-c2232pp | 0 | 0 | 32-DP | 8-UP | 0 |
| nexus 2000 series | n2k-c2248pq | 0 | 0 | 48-DP | 0 | 0 |
| nexus 2000 series | n2k-c2232tm | 0 | 0 | 32-DP | 8-UP | 4-UP |
| nexus 2000 series | n2k-c2232tm-e | 0 | 0 | 32-DP | 8-UP | 0 |
| nexus 2000 series | n2k-c2148t-1ge | 0 | 48-DP | 0 | 4-UP | 0 |
| nexus 2000 series | n2k-c2224tp-1ge | 24-DP | 0 | 0 | 2-UP | 0 |
| nexus 2000 series | n2k-c2248tp-1ge | 48-DP | 0 | 0 | 4-UP | 0 |
| nexus 2000 series | n2k-c2232pp-10ge | 0 | 0 | 32-DP | 8-UP | 0 |
| nexus 2000 series | n2k-c2232tm-10ge | 0 | 0 | 32-DP | 8-UP | 0 |
| nexus 2000 series | n2k-c2224tf | 24-DP | 0 | 0 | 2-UP | 0 |
| nexus 2000 series | n2k-c2248tf | 48-DP | 0 | 0 | 4-UP | 0 |
| nexus 2000 series | n2k-c2248tf-e | 48-DP | 0 | 0 | 4-UP | 0 |
| nexus 2000 series | n2k-c2232pf | 0 | 0 | 32-DP | 8-UP | 0 |
| nexus 2000 series | n2k-c2248pqf | 0 | 0 | 48-DP | 0 | 4-UP |
| nexus 2000 series | n2k-c2232tf | 0 | 0 | 32-DP | 8-UP | 0 |
| nexus 2000 series | n2k-c2232tf-e | 0 | 0 | 32-DP | 8-UP | 0 |
| nexus 2000 series | n2k-c2224tf-1ge | 24-DP | 0 | 0 | 2-UP | 0 |
| nexus 2000 series | n2k-c2248tf-1ge | 48-DP | 0 | 0 | 4-UP | 0 |

FIG. 6

SELF-LEARNING BASED CRAWLING AND RULE-BASED DATA MINING FOR AUTOMATIC INFORMATION EXTRACTION

PRIORITY CLAIM

The present application also claims benefit from Indian provisional Patent Application No. 2345/MUM/2015, filed on Jun. 19, 2015, the entirety of which is hereby incorporated by reference.

TECHNICAL FIELD

The invention generally relates to information extraction, more particularly, the present invention relates to automatic information extraction by self-learning based crawling and rule-based data mining.

BACKGROUND

Today, advancements and changes in technology space are happening at a quick pace. New infrastructure, products, applications, services and technologies are coming up to cope up with the needs of the era. New applications (apps) are being developed with assistance from underlying hardware improvisations. Activities such as analysis, detection, prediction, forecasting, design, planning, etc., are essential for either creation of new advancement or deciding upon futuristic road maps. This requires a hard-bound dependency on valuable information for carrying out the activities mentioned before.

Multi-dimensional data sets are available both online such as Internet and off-line in the form of directory services (pdf, xml, doc, html etc.) and are usually unstructured. It is highly likely that the presentation structure, keywords used, acronyms defined, table formats followed etc., differ from one source to another. Therefore, there lies a challenging task of extracting the valuable/meaningful information specific to a particular domain from multi-dimensional data sets in an automated manner. However, collection of data from these kinds of sources will be a humongous task and highly time consuming in practice.

In literature there are methods/tools/systems available to perform crawling and data mining through independent processes, which may lead to increase in time, memory and processor complexity and may not guarantee the desired accuracy. Therefore a joint crawling and data mining approach is required. To evaluate the complexity and accuracy of the joint crawling and data mining approach, we consider the automatic update of network device repository as a use case through a tool based system implementation which can be extended to other domains as well without any difficulty.

In the use case considered above, the repository needs to be refreshed periodically in order for the tools to sustain, since manual update of such a huge repository is a time consuming and error prone process, and thereafter automated information extraction becomes imperative. Furthermore, the extraction of information becomes more challenging due to different documentation standards used everywhere.

The tools/methods/systems available in prior art do not provide the flexibility of extracting meaningful information by learning the difference in documentation standards as used in the public domain through self-learning systems. Furthermore, systems available with self-learning capability fail to extract relevant information due to challenges posed by data mining techniques.

Thus, there exists a need for a system that allows the automated information retrieval with the on-going ability to learn such documentation standards by incorporating the self-learning crawler and extracting meaningful information from the crawled dataset by applying rule-based data mining techniques.

SUMMARY

Methods and systems are described that enable automatic information retrieval through self-learning based crawling and rule based data mining. Learning the differences in documentation standards and reducing the complexity of automatic updating of repositories are some of the challenges addressed by the systems and methods of present disclosure with applicability to other domains without posing any difficulty.

In an aspect, there is provided a method for automatic information retrieval that may include receiving a request for information extraction and retrieving input information from the request; determining the existence of a crawl policy wherein such determination is performed on the input information; performing assisted crawling in case the input information contains the crawl policy; performing recursive crawling in case the input information does not contain the crawl policy and computing valid paths and links for building up a crawl policy wherein recursive crawling is performed until destination files or web-page is reached; pre-processing dataset obtained after one of the assisted crawling and recursive crawling to remove noisy data to obtain pre-processed relevant dataset; and subjecting the pre-processed dataset to classification rules and decision tree based data mining to extract meaningful information.

In accordance with an embodiment, the method of automatic information extraction may include determining whether valid paths and links computed during recursive crawling need to be saved for future attempts of assisted crawling.

In accordance with an embodiment, the method of automatic information extraction may further include intimating non-existence of crawl policy.

In accordance with an embodiment, the method of automatic information extraction may further include intimating the user of any conflict caused due to one or more classification rules and extracting meaningful information irrespective of type of file formats.

In accordance with an embodiment, the request for initiating updation of database can be system based or user-based.

In accordance with an embodiment, input information for assisted crawling and recursive crawling includes product information as search template and pattern template.

In accordance with an embodiment, classification rules include generic rules and specific rules.

In accordance with an embodiment, new rules can be formulated and added to the classification rules.

In another aspect, the method of automatic information retrieval may include receiving a request for information extraction and retrieving input information from the request; providing input information for performing front-end crawling; pre-processing dataset obtained after front-end crawling to remove the noisy data and to obtain pre-processed relevant dataset; and subjecting the pre-processed relevant dataset to classification rules and decision tree based data mining to extract meaningful information.

In another aspect, there is provided a system for automatic information extraction comprising: an input module for receiving a request for a request for information extraction; a data source for a request for information extraction; one or more processors configured to: responsive to the request for a request for information extraction: determine the existence of a crawl policy within input information; perform one of the front-end crawling, assisted crawling and recursive crawling on the data source; and pre-process relevant dataset obtained for removing noisy data; an extractor to subject pre-processed data to classification rules and decision tree based data mining techniques; and an output module to provide meaningful information.

In accordance with an embodiment, the data source include online and offline sources.

In yet another aspect, there is provided a computer program product for automatic information extraction comprising a non-transitory computer readable medium having program instructions embodied therein for: receiving a request for initiating updation of database and extracting input information from the request; determining the existence of a crawl policy wherein such determination is performed on the input information; performing at least one of the front-end crawling, assisted crawling and recursive crawling; pre-processing dataset obtained after one of the assisted crawling and recursive crawling to remove the noisy data; and subjecting pre-processed relevant dataset to classification rules and decision tree based data mining to extract meaningful information.

BRIEF DESCRIPTION OF THE DRAWINGS

The embodiments herein will be better understood from the following detailed description with reference to the drawings, in which.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
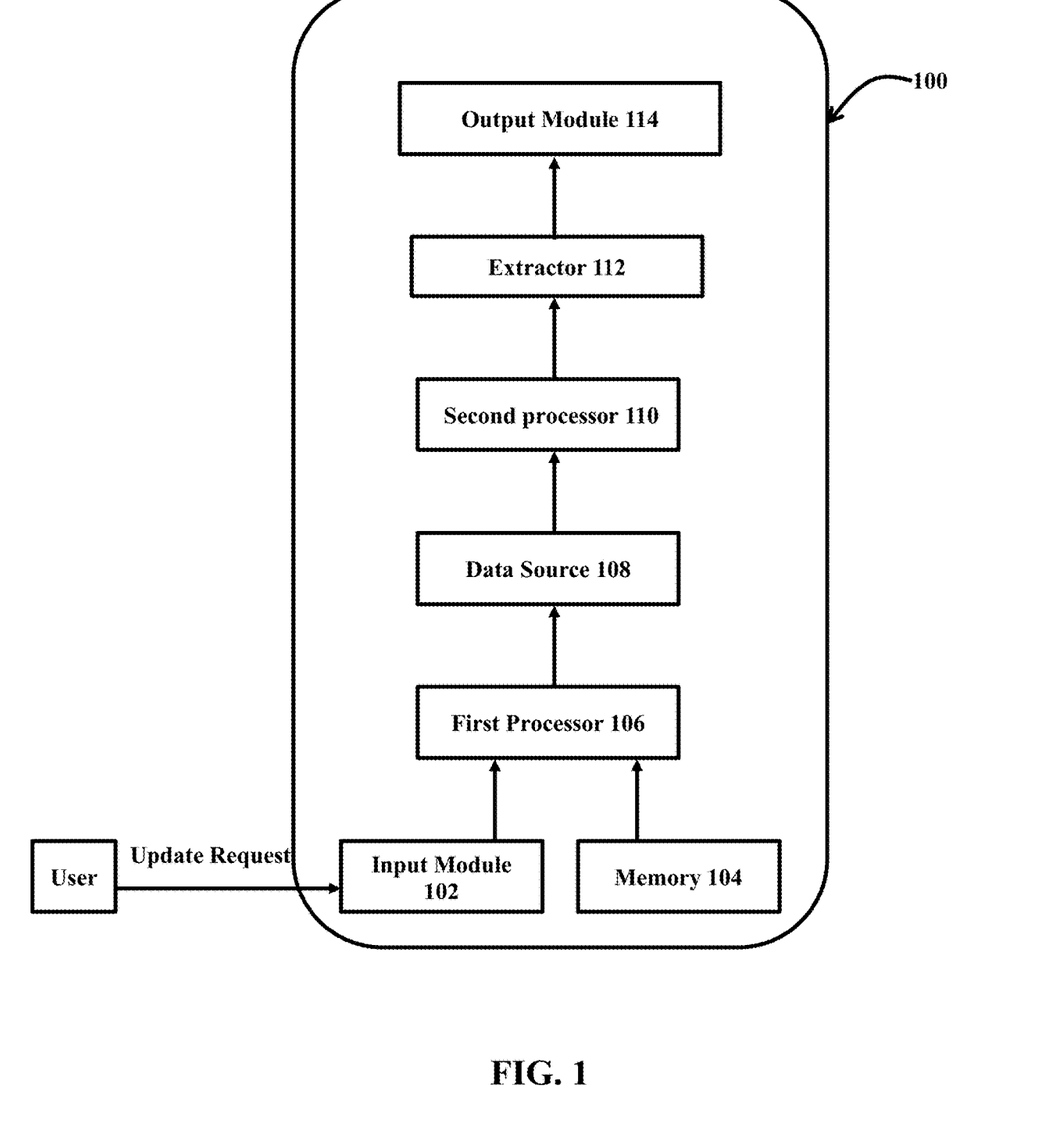
FIG. 1 illustrates an exemplary block diagram of a system for information extraction in accordance with an embodiment of the present invention.
Figure 2:
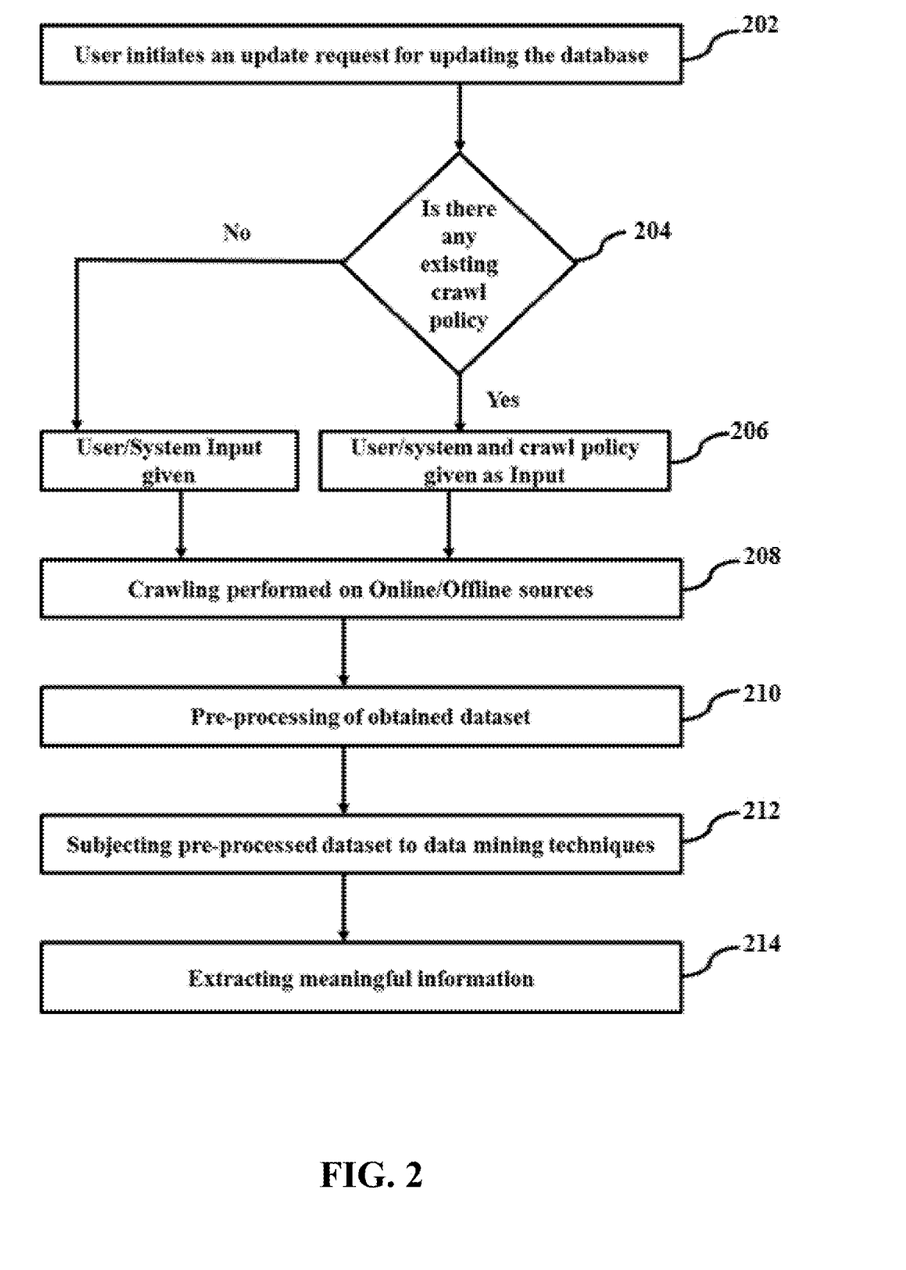
FIG. 2 is an exemplary flow diagram illustrating a method for information extraction using the system of FIG. 1 in accordance with an embodiment of the present invention.

Referring now to the drawings, FIG. 1 illustrates an exemplary block diagram of a system 100 for information extraction in accordance with an embodiment of the present invention. FIG. 2 is an exemplary flow diagram illustrating a method for information extraction using the system of FIG. 1 in accordance with an embodiment of the present invention. The steps of method 200 of the present disclosure will now be explained with reference to the components of system 100 as depicted in FIG. 1.

At step 202, a request can be initiated by either user or the system 100 which is received by an input module 102 of the system 100. The request is raised for automated information extraction. In an embodiment, the request is raised for initiating the process of updating database stored in a memory 104. In an embodiment, database may include without limitation database/repository related to any tool requiring periodic updates. In an embodiment, the request is initiated for information extraction in response to a trigger indicating that a data source 108 has changed. The data source 108 as per the present invention, comprises of online sources and offline sources. The online source includes without limitation the World Wide Web. The offline sources include without limitation directory sources. The process of trigger generation for indicating the changes in the data source 108 is known in the prior art and is not claimed as a part of this present invention.

At step 204, first processor 106 determines the existence of a crawl policy within the system 100. The determination of existence of crawl policy is performed on input information received from the request raised for automatic information extraction. Such check is essential so as to determine whether the input information constitutes user/system inputs and crawl policy. If the first processor 106 fails to find existing crawl policy within the system 100, then the input information does not include the crawl policy. Else, the first processor 106 finds the existing crawl policy, then the input information includes crawl policy in addition to user/system inputs. For the purpose of this invention, the system 100 after at least one round of crawling builds a crawl policy which is used as a constituent of input information in further rounds of crawling. Subsequent rounds of crawling update the crawl policy with each and every crawling attempt. The need to build-up crawl policy happens in scenarios wherein the crawl-policy is neither existing in the system nor user provided. In an embodiment, in the event of non-existent crawl policy, the first processor 106 initiates crawling based on prioritization policy. Subsequent to at least one event of successful crawling, the path crawled is stored and is used as input for further rounds of crawling.

At step 206, the first processor 106 receives the input information for performing crawling from the input module 102 and/or the memory 104. In an embodiment, the input information includes without limitation data related to domain specific search element, configuration parameters such as priorities, rejection policies and user configured rules for extracting relevant information. In an embodiment, the input information may include the crawl policy enabling the first processor 106 to crawl in order to enhance the performance. In an embodiment, the crawl policy may be constructed by user or by the system 100 if it is not present.

At step 208, based on the input information, the first processor 106 executes the crawling and crawls through the data source 108. In accordance with an embodiment, the first processor 106 performs at least one of front-end crawling and assisted crawling and recursive crawling. The assisted crawling and recursive crawling together constitutes the back-end crawling (described in details later).

Front-end crawling as the name suggests is performed on the front-end for online sources and is performed on platforms including without limitations HTML and XML platforms. Front-end crawling is executed through Algorithm 1 as indicated herein below:

---
Algorithm 1 : Front-End Crawling
---
1: Input: Input template for configuration and search information
2: Start
3: Login to the vendor specific website using valid credentials.
4: for i ← 1 to 'n' products in search template do
5:     Feed product[i] to the search query
6:     Select valid links that leads to data-sheet-listing for product[i] based on the path in configuration template and prioritization
7:     for j ← 1 to 'm' data-sheets for product[i] do
8:         if datasheet[j] is not in the repository then
9:             Download datasheet[j] for product[i]
10:         end if
11:     end for
12:     Pre-process and store the data obtained
13:     Fetch meaningful information for product[i] from the data obtained
14: end for
15: Stop
---

The process of front-end crawling as depicted through Algorithm 1 can be used to emulate a browser window programmatically using Java libraries and access the web elements such as hyper-links, buttons, and text box rendered in a HTML web-page as individual entities. The input information that assists the first processor 106 is provided in the form of configuration files containing data dictionary of mapping of different web elements and their names in a web-page.

At step 1 executed by Algorithm 1 includes providing the input information in the form of configuration files and search information. At third step, a login process is initiated requiring user to input valid credentials to approve access.

Figure 3A:
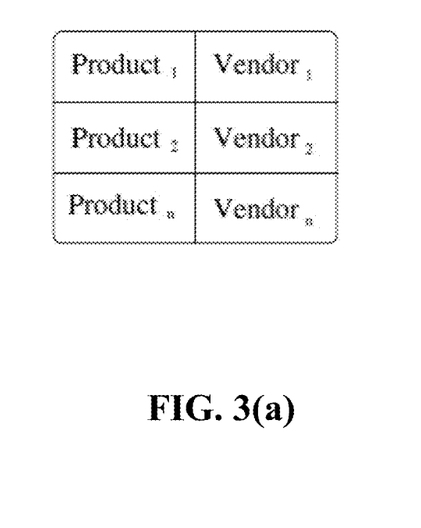
FIG. 3(a) is an illustration of input information for front-end crawling performed within the system of FIG. 1 in accordance with an embodiment of the present invention.

At fifth step, a product information is fed to the first processor 106 which is illustrated in FIG. 3(*a*).

Figure 3B:
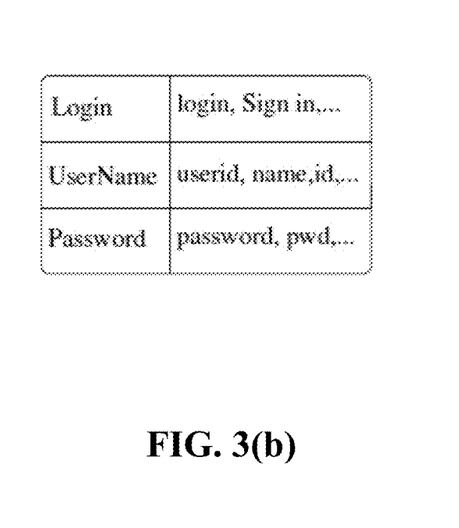
FIG. 3(b) is an illustration of a configuration template for front-end crawling performed within the system of FIG. 1 in accordance with an embodiment of the present invention.

At step 6, online sources are crawled to arrive at web-pages that contain relevant data according to the configuration template as specified by the user and as illustrated in FIG. 3(*b*). In an embodiment, the configuration template includes mapping of different web elements and their possible names in online source such as a web-page.

From step 7 till step 11, the relevant web-pages are downloaded based on priority, freshness and existence of web-page.

Algorithm 1 includes steps for pre-processing of downloaded data and data mining. At Step 12, the pre-processing of dataset obtained after front-end crawling, is performed to obtain pre-processed relevant dataset. The pre-processing is performed to remove the noisy data that often gets downloaded and accumulated with the relevant dataset. The pre-processing is performed by second processor 110.

At step 13, data mining techniques (as illustrated later) are used to obtain meaningful information from the pre-processed relevant dataset obtained at step 12.

The complexity of front-end crawling as illustrated in Algorithm 1 can be represented by equation (1) wherein O is the notation of complexity, n is the number of products to update, k is the number of web-pages downloaded and m is the complexity involved for crawling through website or the number of the hops to arrive at destination files or relevant web-page.

$$\text{Complexity: } O(n \times m + n \times k) \quad (1)$$

Alternatively, the complexity of front-end crawling is a function of number of products to update, number of web-pages downloaded and complexity involved for crawling through website or the number of the hops to arrive at destination files or relevant web-page.

The first processor 106 performs the assisted crawling and recursive crawling through Algorithm 2 and 3. The assisted crawling and recursive crawling together constitutes the back-end crawling. The process of assisted crawling are illustrated in Algorithm 2 (Step 6-12) and the process of recursive crawling are illustrated in Algorithm 2 (Step 14-23) and Algorithm 3 (It should be noted that the assisted crawling and recursive crawling are described in detail in subsequent paragraphs). It should be noted that the first processor 106 performs at least one of the front-end crawling, assisted crawling and recursive crawling to collect data from which meaningful information can be extracted. The front-end crawling, assisted crawling and recursive crawling are independent and mutually exclusive approaches to collect data. In the recursive crawling approach, the first processor 106 recursively crawls through the vendor specific websites following every valid hyper-link in a web-page and backtrack when a broken hyper-link is encountered. This approach is generic, based on Depth First Search (DFS) algorithm and self-learning in nature and can be extended to different domains or domain based application without any difficulties. This crawling mechanism can be assisted by adding identifiers (process described later) for the valid hyper-link patterns leading to the destination. Compared to front-end crawling and recursive crawling, the input information in assisted crawling takes optional input for existing crawling policy, if any. In the event crawl policy is considered for input information, exhaustive searching can be avoided and time complexity can be reduced.

In the case when crawl policy is not supplied by the user and also there are no self-learned policies from the previous attempts is matching the present requirement, then there is a possibility of this approach consuming more time. To prevent this, a threshold can be set either as total time elapsed for crawling or total number of links crawled. In assisted crawling, crawl policy containing patterns to identify valid links that leads to destination files or web-pages is given as input either by user or by repository as a result of previous crawling attempts.

The back-end crawling (assisted crawling and recursive crawling) is executed through Algorithm 2 as illustrated herein below:

---
Algorithm 2: Back-end crawling
---

```
1:  Input: Search Template and Pattern Template
2:  Start
3:  for i ← 1 to 'n' products in search template do
4:      Compute start_url
5:      If patterns exists for product[i] then
6:          crawldata[0].url ← start_url
7:          for j ← 1 to 'm' patterns in pattern template do
8:              for k ← 1 to 't' URLs in crawldata[j – 1].url do
9:                  Select valid URLs from web-page at url[k] based
                    on pattern[j] and prioritization policy
10:             end for
11:             Store url and pattern[j] as
                crawldata[j](pattern[j], url)
12:         end for
13:     else
14:         path ← start_url
15:         Obtain valid_urls from start_url by preprocessing the
            links obtained
16:         for x ← 1 to 'p' valid_urls do
17:             path ← CPR(path, valid_urls[x]) //Algorithm 3
18:             If path is not null then
19:                 Compute and save final path in the system
                    database(Crawlrepository)
20:                 break-for
21:             end if
22:         end for
23:     end if
24:     Obtain set of valid URLs of the web-pages containing data-
        sheets for the product[i]
25:     for y ← 1 to 'q' data-sheets for product[i] do
26:         If datasheet[y] is not available in repository then
27:             Download datasheet[y] for product[i]
28:         end if
29:     end for
30:     Pre-process and store the relevant dataset
31:     Extract meaningful information from the data obtained
32: end for
33: Stop
```

Figure 4A:
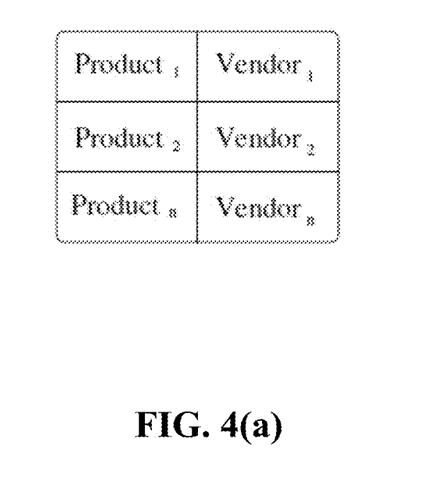
FIG. 4(a) is an illustration of search template for assisted crawling and/or recursive crawling performed within the system of FIG. 1 in accordance with an embodiment of the present invention.

At step 3 of algorithm 2, input information as product information in the form of template is provided. In an embodiment the template includes a search template and/or pattern template. The search template is a list containing product names belonging to a variety of vendors for which meaningful information is to be extracted. The search template is illustrated in FIG. 4(a), The Pattern template includes patterns to identify valid URLs that can lead to destination web-page for a particular product. In the present context as illustrated in Algorithm 2, the pattern template includes patterns of valid URLs for a particular product of particular vendor as illustrated in FIG. 4(b).

The patterns are either available as pattern templates already within the pa system or self-learned in previous crawling attempts.

At step 5, a determination is made as to whether assisted crawling or recursive crawling (described later) to be performed. Such determination is made on the basis of availability of patterns either by pattern template or self-learned in previous crawling attempts.

Figure 4B:
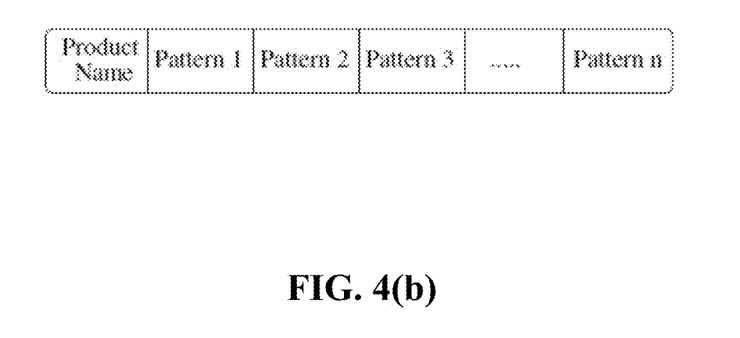
FIG. 4(b) is an illustration of pattern template for assisted crawling and/or recursive crawling performed within the system of FIG. 1 in accordance with an embodiment of the present invention.

From step 6-12, assisted crawling is performed by providing patterns for valid URLs in the pattern template as illustrated in FIG. 4(b). The valid URLs are selected from web-pages based on the crawl policy. At step 11, list of valid URLs obtained for each pattern is stored as an array in the system 100 i.e. crawldata<pattern,<link1,link2, . . . >>"

In response to determination made at step 5, patterns identifying valid URLs for a particular product for a particular vendor are not detected within the system and the recursive crawling is invoked.

In step 14-23, path is computed to reach relevant data in the website.

At Step 17, the path is computed recursively (CPR) wherein the CPR involve computing path and valid URLs. For such computation of path, Algorithm 3 comes into play.

At step 18, a determination is made to check whether path found is to be saved or not. If path is found valid, then it saved as pattern in the crawl repository (Part of memory 104), which can be used in the future crawling attempts At Step 24, a set of web-pages are obtained, containing relevant data.

In step 25-29, obtained web-pages are downloaded based on the priority, freshness and existence of the web-page.

The recursive crawling as performed through algorithm 3 as illustrated herein below:

In Recursive Algorithm 3, the termination condition is whether the link of the web-page in current cycle is of our interest or not and this condition is validated in Step 3-6. In Step 7-16, recursive crawling is performed until destination files or web-page is reached. Step 14 recursively calls the same algorithm until necessary conditions are satisfied. The recursive calling at this step helps in automated information crawling and builds the desired repository of information as requested by user.

The complexity of recursive crawling as performed through algorithm 2 and algorithm 3 is represented by equation (2). Similarly, the complexity of assisted crawling as performed through algorithm 2 is represented by equation (3), wherein n represents the number of products to update, k is the number of web-pages downloaded, m is the complexity involved for crawling based on the steps provided, v is the number of hops required to reach the destination web-page for recursive crawling.

$$\text{Complexity (Recursive crawling): } O(n \times v^2 + n \times k) \quad (2)$$

$$\text{Complexity (Assisted Crawling): } O(n \times m + n \times k) \quad (3)$$

The complexity of assisted crawling is a function of the number of products to update, number of web-pages downloaded and the complexity involved for crawling based on the steps provided. The complexity of recursive crawling is a function of the number of products to update, number of web-pages downloaded and number of hops required to reach the destination web-page for recursive crawling.

The assisted crawling and recursive crawling can also be performed for offline sources. In this approach, the path to the directory structure of a set of files containing relevant data is provided as input information by the user. The first processor 106 crawls through each of the file in the directory and perform identification of the most favorable content as per the configuration parameters for crawling. Thereafter, the content is processed to obtain relevant set of information for next level of processing. Compared to front-end crawling which is limited to online resources, assisted crawling and/or recursive crawling for offline sources can be faster when compared to front-end crawling as the search space is limited and is performed off-line.

At step 210, the second processor 110 pre-processes the relevant dataset downloaded through the front-end crawling, assisted and recursive crawling. The pre-processing is performed to remove the noisy data that gets downloaded. As illustration of such pre-processing includes, without limitation, an instance wherein if the user searches for information related to a network switch, then information related to routers, firewalls, service appliances etc. becomes non-relevant and should be filtered out.

At step 212, the pre-processed data as obtained from step 210, is subjected to classification rules and decision tree based data mining techniques which is performed through Extractor 112. In an embodiment, the classification rules may be categorized into generic rules and specific rules. The generic rules are applicable across different vendors of a particular domain, whereas specific rules are tailor made to a particular vendor of the same domain for a specific set of requirements. For example, fixed configuration of a switch (with 'fixed' as the keyword) can be considered as generic, whereas expansion slot of a switch (keyword 'expansion slot') could be a specific rule for a particular vendor.

Based on the classification rules in Step 212, decision trees are constructed to determine each possible outcome and its course of action in order to take decision on values while extracting meaningful information. It should be noted that new rules can be formulated and added to classification rules list. In an embodiment, new rules can be formulated through self-learning (machine learning) or user-driven techniques. Due to self-learning crawling and rule based data mining, the percentage of accuracy can be improved over successive iterations. In an embodiment, the system 100 stores the data collected and downloaded in the memory 104.

In an embodiment, the system 100 is capable of intimating the user of the absence of crawl policy for running new iteration or if any classification rule is creating any conflict.

Figure 5:
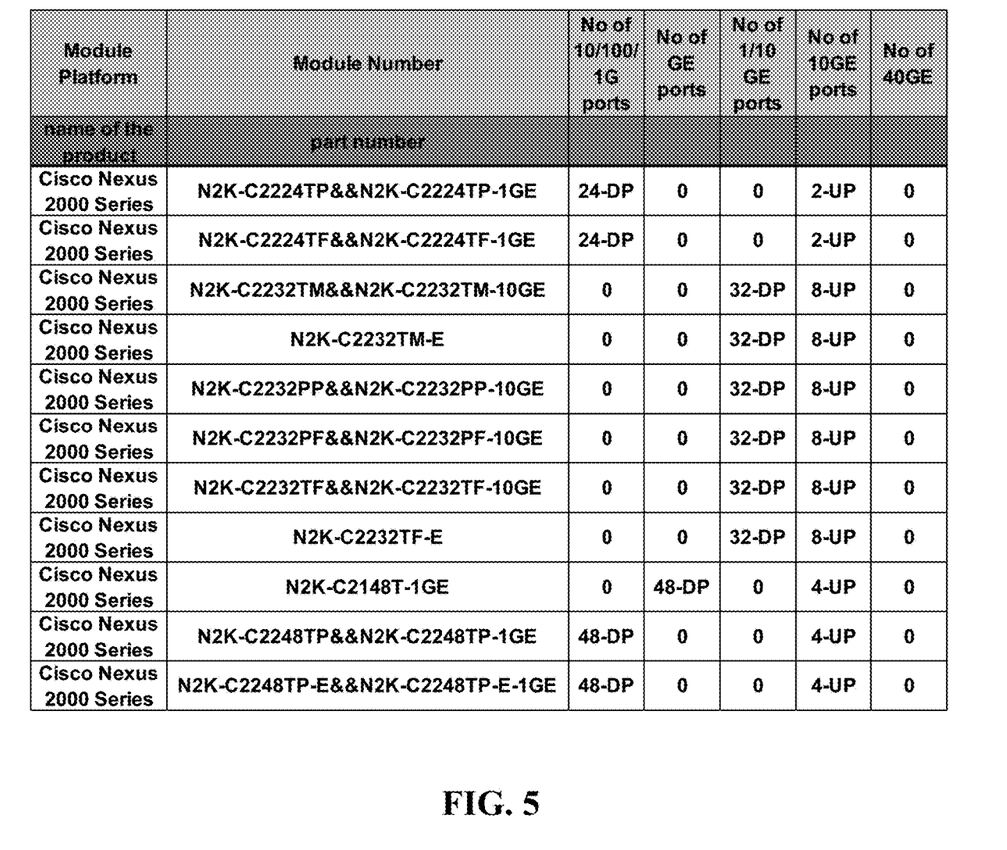
FIG. 5 is an illustration of an exemplary output associated with a manual system of information retrieval and database updation.
Figure 6:
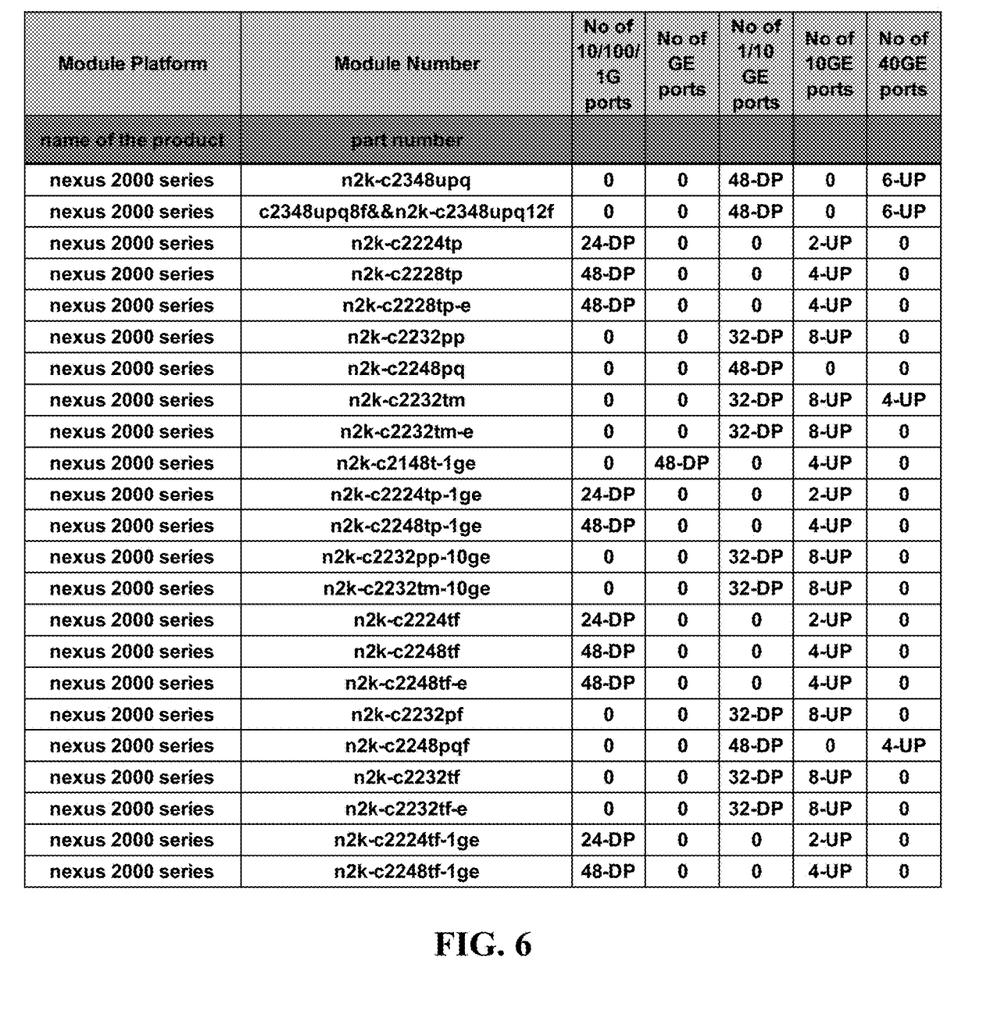
FIG. 6 is an illustration of an exemplary output associated with the system and method as disclosed in FIG. 1 and FIG. 2 respectively for information retrieval and database updation.

At Step 214, the output module 114 provides the meaningful information as fed to the output module 114 by the extractor 112. The meaningful information from the output module 114 as received is illustrated in FIG. 6. In comparison to FIG. 6, the meaningful information extracted by manual system without any self-learning crawler and data mining techniques is illustrated in FIG. 5.

In an embodiment, the system 100 is capable of extracting meaningful information irrespective of the types of file formats in the data source.

Referring now to FIG. 1, a system for self-learning crawling and rule based data-mining is shown, generally designated as 100. The system includes a crawler which may be executed by a first processor 106 within the system 100 as a series of computer-executable instructions. These instructions may reside in a memory 104 and the first processor 106 is configured to fetch and execute computer-readable instructions or modules stored in the memory 104. The system further includes a second processor 110 executing the pre-processing and cleaning of downloaded relevant data set to remove the noisy data. It is to be noted that the first processor 106 and second processor 110 are functionally, structurally and/or operationally distinct. It should be understood that the system 100 can work without the distinction of first processor 106 and second processor 110 wherein the first processor 106 is configured to perform all the tasks as performed by the second processor 110 including but not limited to the pre-processing and cleaning of downloaded relevant dataset to remove noisy data.

The first processor 106 and second processor 110 may be implemented as one or more microprocessors, microcomputers, microcontrollers, digital signal processors, central processing units, state machines, logic circuitries, and/or any devices that manipulate signals based on operational instructions. First and second processors 108 and 110 may exist as separate discrete chips or exist within the same packaged chip (multi-core).

The written description describes the subject matter herein to enable any person skilled in the art to make and use the embodiments of the invention. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

The illustrated steps are set out to explain the exemplary embodiments shown, and it should be anticipated that ongoing technological development will change the manner in which particular functions are performed. These examples are presented herein for purposes of illustration, and not limitation. Further, the boundaries f the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein, Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

Furthermore, the steps described need not be performed in the same sequence discussed or with the same degree of separation. Various steps may be omitted, repeated, combined, or divided, as necessary to achieve the same or similar objectives or enhancements, Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the disclosed invention.

It is intended that the disclosure and examples be considered as exemplary only, with a true scope and spirit of disclosed embodiments being indicated by the following claims.

What is claimed is:

1. A computer implemented method for automatic information extraction comprising:
   receiving a request for information extraction and retrieving input information from the request;
   determining existence of a crawl policy wherein such determination is performed on the input information retrieved from the request;
   performing assisted crawling, for the input information containing the crawl policy and performing recursive crawling for the input information not containing the crawl policy;
   computing valid paths and links for building a new crawl policy based on the assisted crawling and the recursive crawling, wherein the valid paths and links are computed recursively such that the links in a destination file and a web-page in a current crawling cycle matches with one or more previous crawling attempts;
   pre-processing dataset containing the new crawl policy obtained after the assisted crawling and the recursive crawling to remove noisy data and to obtain a pre-processed dataset; and
   subjecting the pre-processed relevant dataset to classification rules and decision tree based data mining to obtain extracted information.

2. The method of claim-1, wherein the request for automatic information extraction can be system based or user-based.

3. The method of claim-1, wherein the input information includes product information as at least one of search template and pattern template.

4. The method of claim-3, wherein the search template includes product names for which information is to be extracted.

5. The method of claim-3, wherein the pattern template includes patterns leading to destination web-pages.

6. The method of claim-1, wherein the assisted crawling is performed based on prioritization policy.

7. The method of claim-1, further comprising:
   determining whether the valid paths and links computed during recursive crawling need to be saved for future attempts of assisted crawling.

8. The method of claim-1, wherein a complexity of assisted crawling is determined according to an expression:

Complexity: $O(n \times m + n \times k)$, where

O is a notation of complexity, n is a number of products to update,
   k is a number of web-pages downloaded and m is a complexity involved for crawling.

9. The method of claim-1, wherein a complexity of assisted crawling is a function of a number of products to update, a number of web-pages downloaded and a complexity involved for crawling.

10. The method of claim-1, wherein a complexity of recursive crawling is determined according to an expression:

Complexity: $O(n \times v^2 + n \times k)$, where

O is a notation of complexity, n is a number of products to update,
   k is a number of web-pages downloaded and v is a number of hops required to reach the destination source for recursive crawling.

11. The method of claim-1, wherein complexity of recursive crawling is a function of the number of products to update, the number of web-pages downloaded and the number of hops required to reach the destination source for recursive crawling.

12. The method of claim-1, wherein the classification rules includes generic rules and specific rules.

13. The method of claim-1, wherein new rules can be formulated and added to classification rules.

14. The method of claim-1, further comprising intimating non-existence of the crawl policy.

15. The method of claim-1, further comprising:
   intimating any conflict caused due to one or more classification rules; and
   extracting information irrespective of type of file formats.

16. The method of claim-1, further comprising:
   receiving a request for information retrieval and retrieving input information from the request;
   providing the input information for performing front-end crawling;
   pre-processing dataset obtained after the front-end crawling to remove noisy data and to obtain the pre-processed dataset; and
   subjecting the pre-processed relevant dataset to classification rules and decision tree based data mining to extract information.

17. The method of claim-16, wherein the input information includes configuration files containing data dictionary for mapping data source.

18. The method of claim-16, wherein a complexity of front-end crawling is determined according to an expression:

Complexity: $O(n \times m + n \times k)$, where

O is a notation of complexity, n is a number of products to update, k is a number of web-pages downloaded and m is a complexity involved for front-end crawling through website or a number of hops to arrive at destination source.

19. The method of claim-16, wherein a complexity of front-end crawling is a function of a number of products to update, a number of web-pages downloaded and a complexity involved for front-end crawling through website or a number of hops to arrive at destination source.

20. A computer implemented system for automatic information extraction comprising:
    an input module for receiving a request for information extraction and retrieving information from the request;
    a data source for information extraction;
    one or more processor configured to:
        responsive to the request for information extraction:
            determine the existence of a crawl policy, wherein such determination is performed within input information retrieved from the request;
            perform at least one of the front-end crawling, assisted crawling and recursive crawling on the input information;
            computing valid paths and links for building a new crawl policy based on the assisted crawling and the recursive crawling, wherein the valid paths and links are computed recursively such that the links in a destination file and a web-page in a current crawling cycle matches with one or more previous crawling attempts;
            pre-processing dataset containing the new crawl policy obtained after the assisted crawling and the recursive crawling to remove noisy data and to obtain a pre-processed dataset;
    an extractor to subject pre-processed data to classification rules and decision tree based data mining techniques; and
    an output module to provide extracted information.

21. The system of claim-20, wherein data source include online and offline sources.

22. A non-transitory computer readable medium embodying a program executable in a computing device for automatic information extraction, the program comprising:
    receiving a request for information extraction and retrieving input information from the request;
    determining existence of a crawl policy wherein such determination is performed on the input information retrieved from the request;
    performing assisted crawling, for the input information containing the crawl policy and performing recursive crawling for the input information not containing the crawl policy;
    computing valid paths and links for building a new crawl policy based on the assisted crawling and the recursive crawling, wherein the valid paths and links are computed recursively such that the links in a destination file and a web-page in a current crawling cycle matches with one or more previous crawling attempts;
    pre-processing dataset containing the new crawl policy obtained after the assisted crawling and the recursive crawling to remove noisy data and to obtain a pre-processed dataset; and
    subjecting the pre-processed relevant dataset to classification rules and decision tree based data mining to obtain extracted information.

\* \* \* \* \*